US010486489B2

(12) United States Patent
Igarashi et al.

(10) Patent No.: US 10,486,489 B2
(45) Date of Patent: Nov. 26, 2019

(54) VEHICLE AIR-CONDITIONING SYSTEM

(71) Applicant: Mitsubishi Electric Corporation, Chiyoda-ku (JP)

(72) Inventors: Yuji Igarashi, Tokyo (JP); Masahiko Ikawa, Tokyo (JP); Yuko Ota, Tokyo (JP); Kazushi Shirasawa, Tokyo (JP); Takashi Irie, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/061,580

(22) PCT Filed: Jun. 15, 2016

(86) PCT No.: PCT/JP2016/067813
§ 371 (c)(1),
(2) Date: Jun. 12, 2018

(87) PCT Pub. No.: WO2017/119150
PCT Pub. Date: Jul. 13, 2017

(65) Prior Publication Data
US 2018/0361823 A1 Dec. 20, 2018

(30) Foreign Application Priority Data
Jan. 7, 2016 (JP) .................................. 2016-001522

(51) Int. Cl.
*B60H 1/00* (2006.01)
(52) U.S. Cl.
CPC ..... *B60H 1/00735* (2013.01); *B60H 1/00392* (2013.01); *B60H 1/00771* (2013.01); *B60H 1/00792* (2013.01); *B60H 1/00964* (2013.01)

(58) Field of Classification Search
CPC ............ B60H 1/00921; B60H 1/00392; B60H 1/00735; B60H 1/00771; B60H 1/00792; B60H 1/00964
(Continued)

(56) References Cited

U.S. PATENT DOCUMENTS

2009/0031741 A1* 2/2009 Hara .................. B60H 1/00735
62/239
2011/0172880 A1 7/2011 Tamura
(Continued)

FOREIGN PATENT DOCUMENTS

| JP | 2003-306021 A | 10/2003 |
|----|---------------|---------|
| JP | 2004-74824 A  | 3/2004  |

(Continued)

OTHER PUBLICATIONS

International Preliminary Report on Patentability and Written Opinion dated Jul. 19, 2018 in PCT/JP2016/067813, with English translation, 16 pages.
(Continued)

*Primary Examiner* — Davis D Hwu
(74) *Attorney, Agent, or Firm* — Oblon, McClelland, Maier & Neustadt, L.L.P.

(57) ABSTRACT

A vehicle air-conditioning system capable of reducing energy consumed during traveling while preventing a significant uncomfortable feeling of a user. An inside-vehicle environment predicting unit calculates, by using inside-vehicle sensor information and outside-vehicle sensor information being output from an environmental sensor device and a predicted travel time acquired by a predicted travel information acquisition unit, at least one predicted environmental characteristic which is an environmental characteristic inside a vehicle after a predicted travel time on an assumption that an air-conditioning device is operated in
(Continued)

each of at least one candidate mode which has lower intensity than intensity of a selection mode among a plurality of operation modes. A mode controller resets the selection mode to one of the at least one candidate mode, in which the predicted environmental characteristic being within the allowable range is calculated by the inside-vehicle environment predicting unit.

11 Claims, 15 Drawing Sheets

(58) Field of Classification Search
USPC .......................................................... 165/202
See application file for complete search history.

(56) References Cited

U.S. PATENT DOCUMENTS

| 2013/0068443 | A1* | 3/2013 | Yen ..................... | B60H 1/00392 |
| | | | | 165/253 |
| 2016/0016484 | A1 | 1/2016 | Igarashi et al. | |
| 2016/0075214 | A1* | 3/2016 | Hamamoto ........ | B60H 1/00921 |
| | | | | 62/160 |

FOREIGN PATENT DOCUMENTS

| JP | 2007-269275 A | 10/2007 |
| JP | 2009-56940 A | 3/2009 |
| JP | 2011-37385 A | 2/2011 |
| JP | 2011-255686 A | 12/2011 |
| JP | 2012-20597 A | 2/2012 |
| JP | 2012-47398 A | 3/2012 |
| JP | 2012-139026 A | 7/2012 |
| JP | 2013-18361 A | 1/2013 |
| WO | WO 2010/035329 A1 | 4/2010 |
| WO | WO 2014/141532 A1 | 9/2014 |

OTHER PUBLICATIONS

International Search Report dated Sep. 6, 2016 in PCT/JP2016/067813 filed Jun. 15, 2016.

Notification of Reasons for Refusal dated Feb. 17, 2017 in Japanese Patent Application No. 2016-575688 (with English language machine translation).

* cited by examiner

F I G. 9
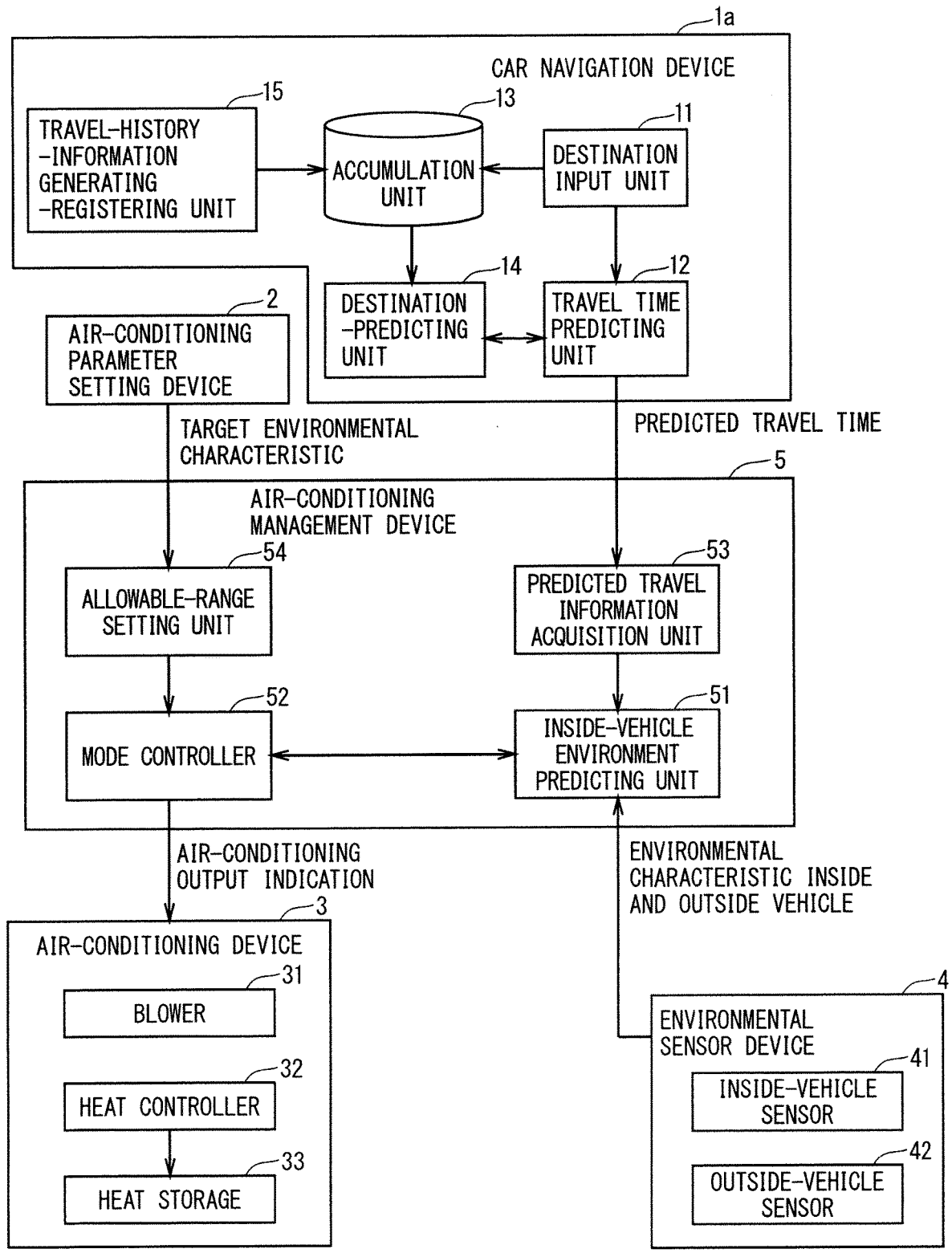

F I G. 1 0
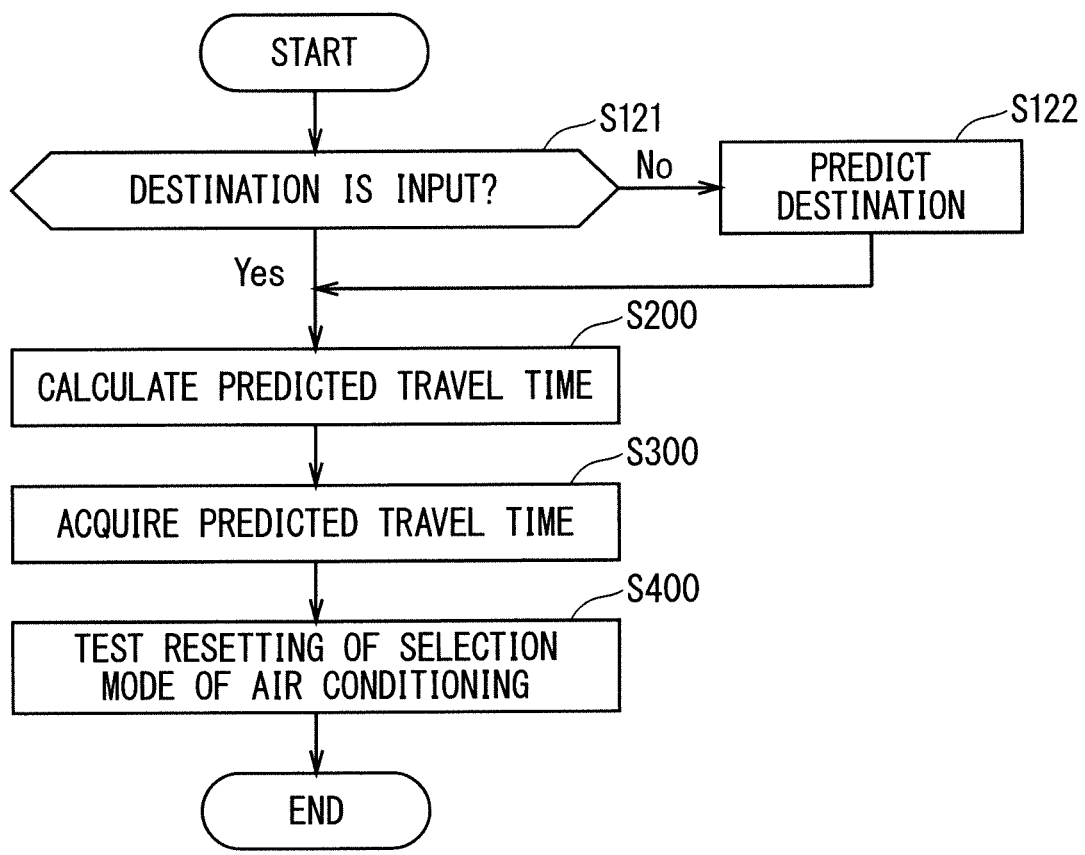

VEHICLE AIR-CONDITIONING SYSTEM

TECHNICAL FIELD

The present invention relates to a vehicle air-conditioning system.

BACKGROUND ART

Recently, an electrical car in which an electrical motor (also referred to as "a motor" hereinafter) is used as a drive source has been put to practical use from a standpoint of a reduction in dioxide emission and an efficient use of energy, for example. The motor applies electrical energy stored in a storage battery (also referred to as "a battery" hereinafter) as a power source. An energy concentration in the battery for the electrical car is small compared to gasoline. Accordingly, a cruising distance of the electrical car is short, approximately 100 to 200 km. The cruising distance is further reduced in accordance with a power consumption due to electrical load of an air-conditioning machine (an air conditioner) provided in the electrical car. Considered as one of approaches to solve the above problem is a method of mounting a heat storage made up of a heat storage material in the air conditioner. If the heat storage is heated in advance, air heating by using the heat storage can be achieved. In contrast, if the heat storage is cooled in advance, the heat storage material functions as a cooling storage material, thereby enabling air cooling by using the heat storage. Accordingly, the electrical power consumed in the air conditioner during traveling can be reduced.

According to a technique of Japanese Patent Application Laid-Open No. 2012-20597 (Patent Document 1), when regeneration power exceeding a battery capacity is generated, the cooling storage material is cooled by using the regeneration power. Accordingly, the electrical power which cannot be stored in the battery is effectively used. The electrical power consumed during the traveling is therefore reduced. This technique is effective in an electrical hybrid car applying both a motor and an engine as a power source. The reason is that in the electrical hybrid car, the battery is charged by generating the electrical power using the engine during the traveling, thus a space for enabling the storage of the regeneration power is not always secured in the battery.

In the meanwhile, the technique described above is not appropriate for the electrical car. The reason is that electrical power larger than regeneration power is already taken out from a battery of the electrical car for the electrical car traveling before the regeneration power is generated. Japanese Patent Application Laid-Open No. 2012-139026 (Patent Document 2) discloses a technique relating to the electrical car. According to this technique, a setting of increasing the power consumption in electrical equipment such as an air conditioner and an audio device can be suppressed so that the electrical power necessary for the electrical car to travel to a charging facility is secured. Accordingly, the power consumption is suppressed when the electrical power for traveling to the charging facility comes close to becoming insufficient.

PRIOR ART DOCUMENTS

Patent Documents

Patent Document 1: Japanese Patent Application Laid-Open No. 2012-20597

Patent Document 2: Japanese Patent Application Laid-Open No. 2012-139026

SUMMARY

Problem to be Solved by the Invention

As described above, in the electrical hybrid car, the technique of Japanese Patent Application Laid-Open No. 2012-20597 (Patent Document 1) can reduce the energy consumed during the traveling to some extent. However, further reduction in consumption energy is always required in a field of cars.

The technique of Japanese Patent Application Laid-Open No. 2012-139026 (Patent Document 2) is effective only in the case where the electrical power for traveling to the charging facility comes close to becoming insufficient. Thus, there may be less opportunity that the power consumption is actually suppressed. Moreover, this technique may excessively suppress the operation of the air-conditioner. In the above case, discomfort of a user may be increased.

The present invention therefore has been made to solve problems as described above, and it is an object of the present invention to provide a vehicle air-conditioning system capable of reducing energy consumed during the traveling while preventing a significant uncomfortable feeling of a user.

Means to Solve the Problem

A vehicle air-conditioning system of the present invention includes an air-conditioning device, an environmental sensor device, an air-conditioning parameter setting device, and an air-conditioning management device. The air-conditioning device performs air conditioning inside a vehicle in a selection mode, which is one of a plurality of operation modes, when a notification of air-conditioning output indication information indicating the selection mode is transmitted to the air-conditioning device. The environmental sensor device outputs inside-vehicle sensor information indicating a detection result of an environmental characteristic inside the vehicle and outside-vehicle sensor information indicating a detection result of an environmental characteristic outside the vehicle. The air-conditioning parameter setting device outputs targeted environmental characteristic information indicating a target of the environmental characteristic inside the vehicle. The air-conditioning management device includes an allowable-range setting unit, a predicted travel information acquisition unit, an inside-vehicle environment predicting unit, and a mode controller. The allowable-range setting unit sets an allowable range of the environmental characteristic inside the vehicle based on the targeted environmental characteristic information being output from the air-conditioning parameter setting device. The predicted travel information acquisition unit acquires predicted travel time information indicating a predicted travel time until the vehicle reaches the destination. The inside-vehicle environment predicting unit calculates, by using the inside-vehicle sensor information and the outside-vehicle sensor information being output from the environmental sensor device and the predicted travel time acquired by the predicted travel information acquisition unit, at least one predicted environmental characteristic which is an environmental characteristic inside the vehicle after the predicted travel time on an assumption that the air-conditioning device is operated in each of at least one candidate mode which has lower intensity than intensity of the selection mode among the plurality of operation modes. The mode controller transmits a notification of the air-conditioning output indication information to the air-conditioning device. The mode controller resets the selection mode to one of the at least one candidate mode in which the predicted environmental characteristic being within the allowable range is calculated by the inside-vehicle environment predicting unit.

"Intensity" described above may be zero. In the operation mode having the intensity of zero, the air-conditioning device is substantially in a stop state.

Effects of the Invention

According to the present invention, the mode controller resets the selection mode to one of the at least one candidate mode in which the predicted environmental characteristic being within the allowable range is calculated by the inside-vehicle environment predicting unit. Accordingly, the air conditioning is performed in the operation mode which has the lower intensity, while keeping the environmental characteristic inside the vehicle at the time of reaching the destination within the allowable range. Thus, suppressed is waste that air conditioning being excessive compared to the allowable range has already been performed by the time of reaching the destination. Thus, energy consumed during the traveling can be reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 9 A functional block diagram schematically illustrating a configuration of a vehicle air-conditioning system according to an embodiment 3 of the present invention.

FIG. 10 A flow chart schematically illustrating a configuration of a method of controlling an air-conditioning device according to the vehicle air-conditioning system in the embodiment 3 of the present invention.

DESCRIPTION OF EMBODIMENT(S)

Figure 1:
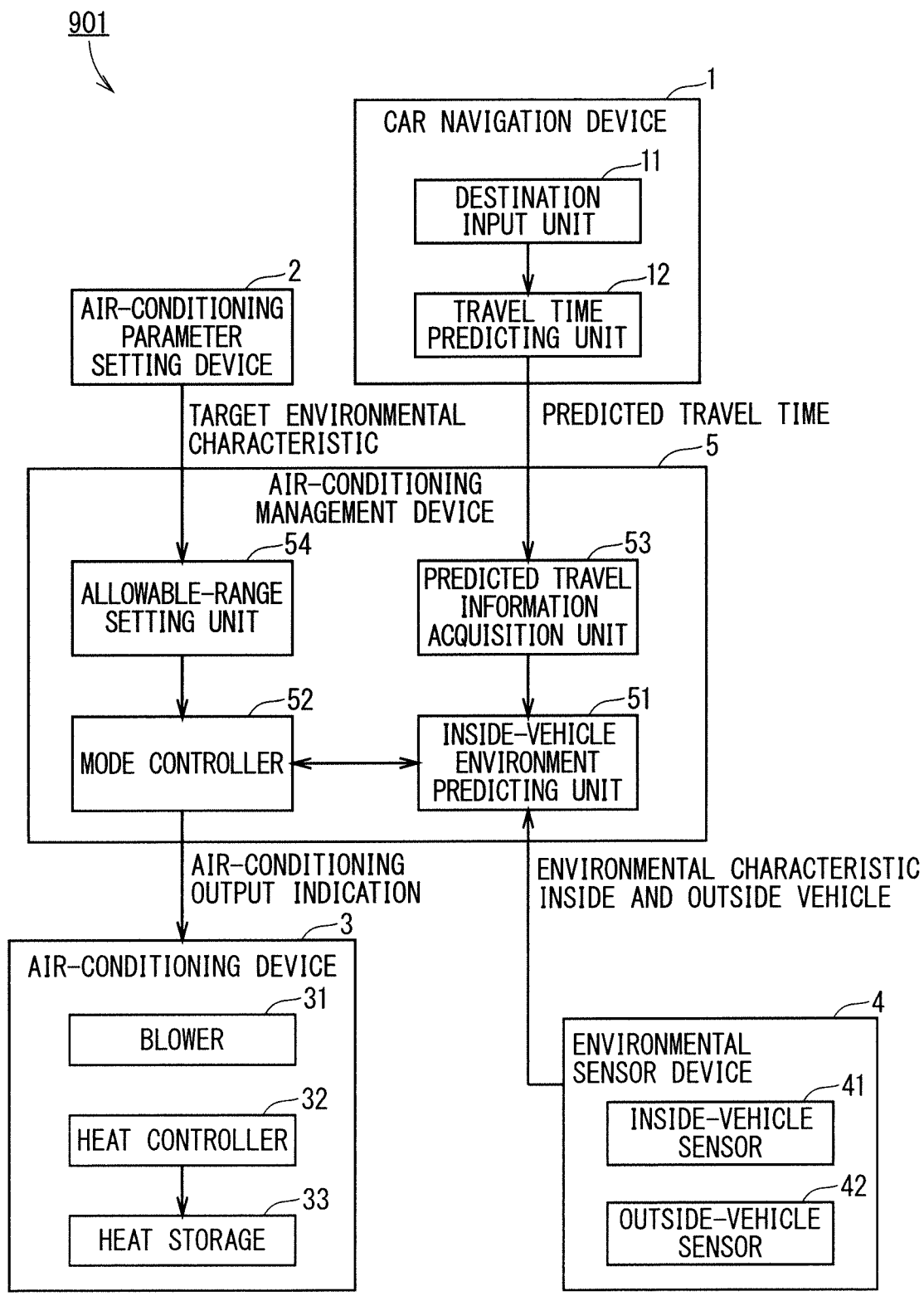
FIG. 1 A functional block diagram schematically illustrating a configuration of a vehicle air-conditioning system according to an embodiment 1 of the present invention.

Embodiments of the present invention are described based on the drawings hereinafter. The same reference numerals as those described in the drawings hereinafter will be assigned to the same or corresponding element, and a repetitive description is not repeated.

Embodiment 1

(Configuration)

Figure 2:
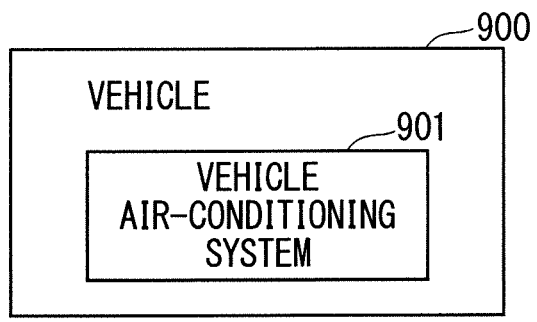
FIG. 2 A diagram schematically illustrating a configuration of a vehicle in which the vehicle air-conditioning system in FIG. 1 is provided.

With reference to FIG. 1, a vehicle air-conditioning system 901 of the present embodiment includes a car navigation device 1, an air-conditioning parameter setting device 2, an air-conditioning device 3, an environmental sensor device 4, and an air-conditioning management device 5. With reference to FIG. 2, the vehicle air-conditioning system 901 is provided in a vehicle 900 to perform air conditioning of the vehicle 900. Although details are described hereinafter, a part of the vehicle air-conditioning system may also be provided outside the vehicle. The vehicle air-conditioning system 901 predicts an environmental characteristic inside the vehicle 900 at a time of reaching a destination. Examples of the environmental characteristic typically include temperature, however, humidity and sunlight intensity, for example, may also be considered. A case where the environmental characteristic is the temperature is described in detail hereinafter for simplifying the description. The vehicle air-conditioning system 901 resets an operation mode of the air-conditioning device 3 to have lower intensity within a range that the predicted environmental characteristic inside the vehicle 900 is within an allowable range. Accordingly, energy consumed during traveling can be reduced while a significant uncomfortable feeling of a user is prevented.

The car navigation device 1 includes a destination input unit 11 and a travel time predicting unit 12. The destination input unit 11 receives an input of a destination of the vehicle 900 from the user. The travel time predicting unit 12 calculates predicted travel time information, which indicates a predicted travel time until the vehicle 900 reaches the destination, and then outputs a calculation result thereof.

The air-conditioning parameter setting device 2 outputs targeted environmental characteristic information, which indicates a target of the environmental characteristic inside the vehicle 900. In other words, a target temperature, which is a target of the environmental characteristic inside the vehicle 900, is set by the air-conditioning parameter setting device 2. The air-conditioning parameter setting device 2 preferably has a mechanism for receiving an input of the target temperature or information corresponding to the target temperature from the user. Used as such a mechanism is, for example, a button, a lever, or an input device by which a numerical value such as "23.5° C." can be input. An allowable-range setting unit 54 preferably sets the allowable range by using latest targeted environmental characteristic information. For this purpose, when the setting of the air-conditioning parameter setting device 2 is changed, the allowable-range setting unit 54 preferably resets the allowable range by using the changed information.

The air-conditioning device 3 includes a heat storage 33, a heat controller 32, and a blower 31. The heat storage 33 is preferably made up of a heat storage material having large specific heat. Several liters of water, for example, is used as the heat storage material. As described above, if the heat storage 33 is heated in advance, air heating by using the heat storage 33 can be achieved. In contrast, if the heat storage 33 is cooled in advance, the heat storage material functions as a cooling storage material, thereby enabling air cooling by using the heat storage 33. The heat controller 32 performs at least one of heating and cooling of the heat storage 33. The heat controller 32 is an electrical heater or a heat pump, for example. The blower 31 sends, into a vehicle interior of the vehicle 900, air on which a heat exchange with the heat storage 33 has been performed. The blower 31 is, for example, a fan rotated by a motor.

When a notification of air-conditioning output indication information indicating a selection mode, which is one of a plurality of operation modes, is transmitted to the air-conditioning device 3, the air-conditioning device 3 performs the air conditioning of the vehicle interior of the vehicle 900 in the selection mode. The plurality of operation modes may include an operation mode for operating the blower 31 while stopping the heat controller 32. Although various modes may be applied to the operation mode in accordance with specifications of the air-conditioning device 3, in the description described hereinafter, the operation mode has a stop mode, a low mode, a middle mode, and a high mode in ascending order of intensity (in other words, in ascending order of energy consumption) for easy understanding. In the stop mode, both the blower 31 and the heat controller 32 are stopped. In the low mode, the heat controller 32 is stopped, and the blower 31 is operated. In the middle mode and the high mode, both the heat controller 32 and the blower 31 are operated. Operation intensity of the heat controller 32 (for example, electrical power of an electrical heater) is relatively low in the middle mode, and relatively high in the high mode.

The environmental sensor device 4 has an inside-vehicle sensor 41 and an outside-vehicle sensor 42. Using these sensors, the environmental sensor device 4 outputs inside-vehicle sensor information indicating a detection result of the environmental characteristic inside the vehicle 900, and outputs outside-vehicle sensor information indicating a detection result of the environmental characteristic outside the vehicle 900. Each of the inside-vehicle sensor 41 and the outside-vehicle sensor 42 typically has a temperature sensor.

Figure 16:
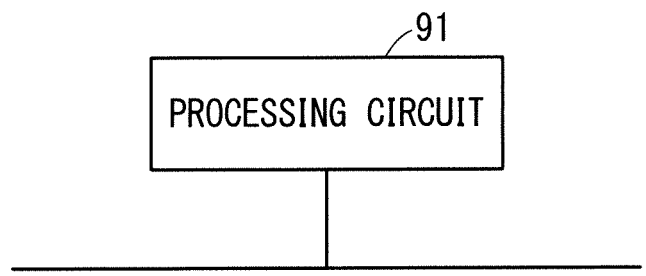
FIG. 16 A block diagram illustrating an example of a hardware configuration of an air-conditioning management device.
Figure 17:
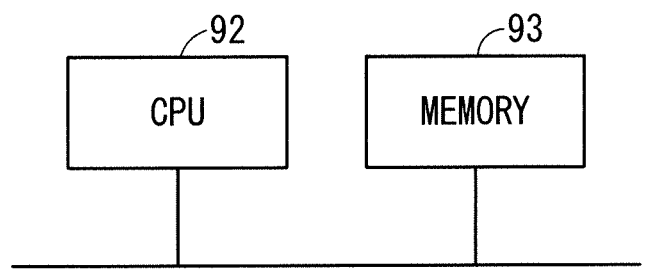
FIG. 17 A block diagram illustrating an example of a hardware configuration of the air-conditioning management device.

The air-conditioning management device 5 has the allowable-range setting unit 54, a predicted travel information acquisition unit 53, an inside-vehicle environment predicting unit 51, and a mode controller 52. The air-conditioning management device 5 may constitute an electrical circuit as a processing circuit 91 (FIG. 16). To the processing circuit 91, dedicated hardware may be applied, a CPU (Central Processing Unit) 92 (FIG. 17) for executing a program stored in a memory 93 (FIG. 17) may be applied, or a combination of them may be applied. Software is described as a program, and stored in the memory 93. The CPU 92 reads out and executes the program stored in the memory 93 to achieve a function of each unit in the air-conditioning management device 5. A non-volatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), an HDD (Hard Disk Drive), a magnetic disc, a flexible disc, an optical disc, a compact disc, a mini disc, a DVD (Digital Versatile Disc), or a drive device of them, for example, falls under the memory 93. For example, the air-conditioning management device 5 is achieved by a microcomputer having a built-in CPU and a built-in flash ROM.

The allowable-range setting unit 54 sets the allowable range of the environmental characteristic inside the vehicle 900 based on the targeted environmental characteristic information being output from the air-conditioning parameter setting device 2. For example, when the target temperature is 23° C., the allowable range is set to be the target temperature ±1° C., that is to say, 22° C. to 24° C. The allowable range is preferably within a range of value that a user (a driver or a passenger) cannot feel. Such a range of value can be determined in advance by an experiment, for example.

The predicted travel information acquisition unit 53 acquires the predicted travel time information, which indicates the predicted travel time until the vehicle 900 reaches the destination. The predicted travel time information is acquired from the travel time predicting unit 12 of the car navigation device 1.

The inside-vehicle environment predicting unit 51 calculates at least one predicted environmental characteristic. The at least one predicted environmental characteristic is the environmental characteristic inside the vehicle 900 after the predicted travel time on an assumption that the air-conditioning device 3 is operated in each of at least one candidate mode. The at least one candidate mode has lower intensity than that of the selection mode (the operation mode being currently used) among the plurality of operation modes. The predicted environmental characteristic is calculated by using the inside-vehicle sensor information, the outside-vehicle sensor information being output from the environmental sensor device 4, and the predicted travel time acquired by the predicted travel information acquisition unit 53.

The mode controller 52 transmits the notification of the air-conditioning output indication information indicating the selection mode, which is one of the plurality of operation modes, to the air-conditioning device 3. The mode controller 52 resets the selection mode to at least one allowable mode described below among at least one candidate mode. "An allowable mode" means, among the at least one candidate mode, a mode in which the predicted environmental characteristic within the allowable range determined by the allowable-range setting unit 54 is calculated by the inside-vehicle environment predicting unit 51.

When the plurality of operation modes includes a plurality of modes each having lower intensity than that of the selection mode, the at least one candidate mode may include a plurality of candidate modes. For example, when the current selection mode is the high mode, the operation mode includes the middle mode, the low mode and the stop mode as a plurality of candidate modes.

The mode controller 52 resets the selection mode to the mode having the lowest intensity among the plurality of allowable modes when there are the plurality of allowable modes. For example, among the middle mode, the low mode, and the stop mode as the candidate modes, when the middle mode and the low mode are the allowable modes, the selection mode is reset to the low mode, which has the lowest intensity out of the middle mode and the low mode.

(Operation)

Further with reference to FIG. 3, an operation of the vehicle air-conditioning system 901 (FIG. 1) is described below.

In Step S100, the destination input unit 11 receives the information of the destination from the user. In Step S200, the travel time predicting unit 12 predicts the time required to reach the destination. Then, the travel time predicting unit 12 outputs the time as the predicted travel time information. The predicted travel time information is preferably updated in an appropriate cycle, and a result thereof is output again. This cycle is defined by an elapse of a certain period of time or traveling a certain distance, for example. In Step S300, the predicted travel information acquisition unit 53 acquires the predicted travel time information being output from the car navigation device 1.

In Step S400, the air-conditioning management device 5 tests the resetting of the selection mode of the air-conditioning device 3. Accordingly, the resetting to the operation mode which has the lower intensity can be performed.

The operation described above is preferably repeated not only when the destination is input but also in an appropriate cycle subsequently. This cycle is defined by an elapse of a certain period of time or traveling a certain distance, for example.

Next, details of the above Step S400 are described below with first and second examples.

Figure 4:
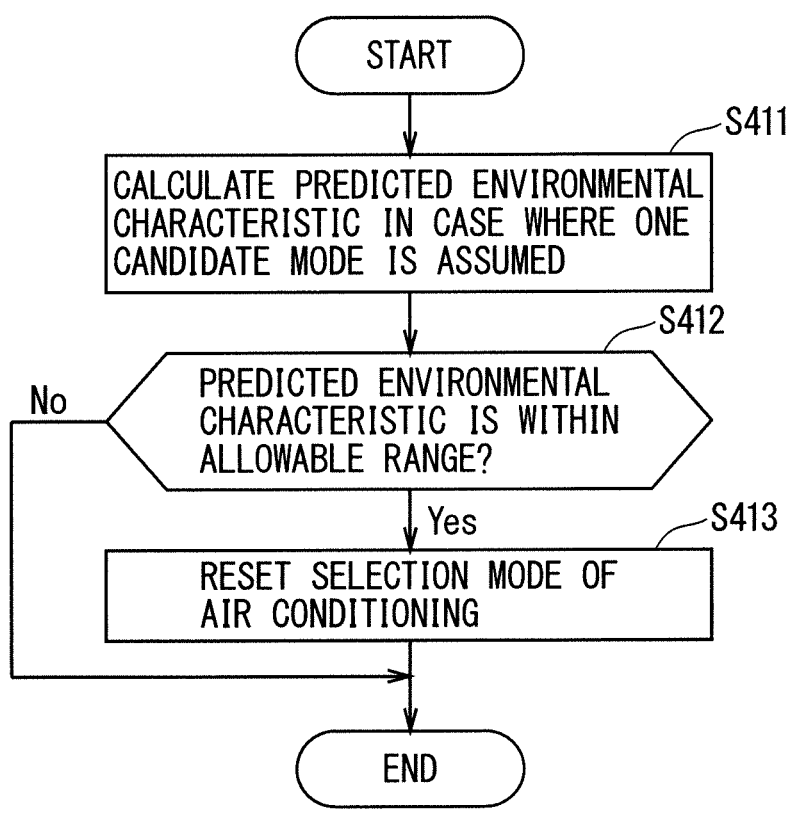
FIG. 4 A flow chart illustrating a first example of a step of resetting a selection mode in FIG. 3.
Figure 5:
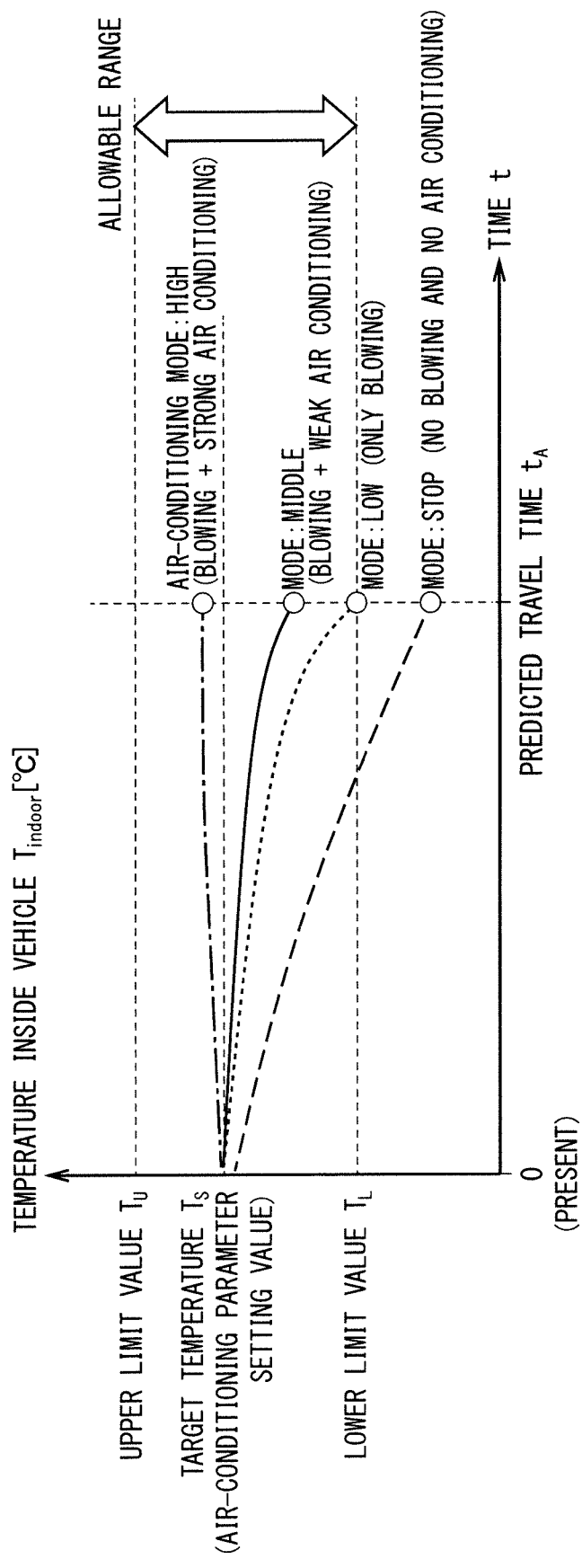
FIG. 5 A graph drawing for describing a calculation of a predicted environmental characteristic in FIG. 4.

With reference to FIG. 4, in the first example, the inside-vehicle environment predicting unit 51 calculates, in Step S411, the predicted environmental characteristic which is the environmental characteristic inside the vehicle 900 after the predicted travel time in a case where one candidate mode is assumed. With reference to FIG. 5, for example, when the current selection mode is the high mode, the middle mode, which is the operation mode one stage lower than the high mode, is assumed as one candidate mode. Then, a predicted temperature $T_{indoor}$ ($t_A$), which is a predicted temperature inside the vehicle 900 after a predicted travel time $t_A$, is calculated.

In Step S412, the mode controller 52 determines whether the predicted temperature $T_{indoor}$ ($t_A$) is within the allowable range. The allowable range is set by the allowable-range setting unit 54 based on a target temperature $T_S$ being set by the air-conditioning parameter setting device 2. In the example in FIG. 5, the allowable range is within a range equal to or larger than a lower limit value $T_L$ and equal to or smaller than an upper limit value $T_U$ ($T_L \leq T_S \leq T_U$). Thus, it is determined whether or not $T_L \leq T_{indoor}$ ($t_A$) $\leq T_U$ is satisfied. When the determination result is true (YES), the selection mode of the air-conditioning device 3 is reset to the candidate mode described above in Step S413, and subsequently, the processing is finished. When the determination result is false (NO), the processing is finished without the resetting.

Figure 6:
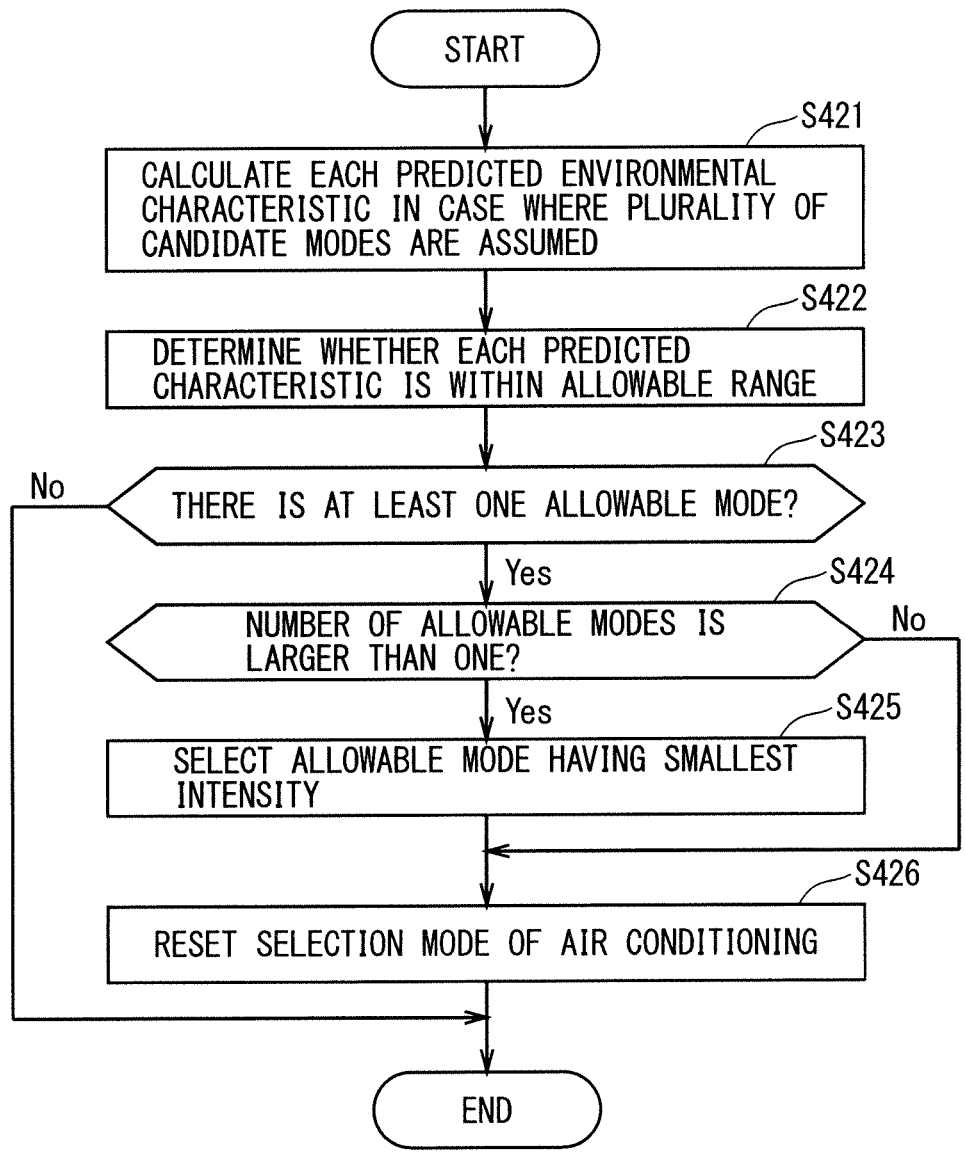
FIG. 6 A flow chart illustrating a second example of the step of resetting the selection mode in FIG. 3.

With reference to FIG. 6, in the second example, the inside-vehicle environment predicting unit 51 calculates, in Step S421, the plurality of predicted environmental characteristics which are the environmental characteristics inside the vehicle 900 after the predicted travel time in a case where each of the plurality of candidate modes is assumed.

With reference to FIG. 5, for example, when the current selection mode is the high mode, the middle, low and stop modes, which are the operation modes lower than the high mode, are assumed as the candidate modes. Then, the predicted temperature $T_{indoor}$ ($t_A$) inside the vehicle 900 after the predicted travel time $t_A$ is calculated for each mode assumed as the candidate modes.

In Step S422, the mode controller 52 determines whether the predicted temperature $T_{indoor}$ ($t_A$) is within the allowable range for each candidate mode. In other words, it is determined whether each candidate mode is the allowable mode.

In Step S423, it is determined whether there is at least one allowable mode. When the determination result is false (NO), the processing is finished. When the determination result is true (YES), it is determined in Step S424 whether a total number of allowable modes is larger than one.

When the determination result in Step S424 is false (NO), there is only one allowable mode, thus the selection mode is reset to this allowable mode in Step S426. When the determination result is true (YES), one allowable mode having the lowest intensity is selected in Step S425. Then, the selection mode is reset to the selected allowable mode in Step S426. For example, when there are the low mode and the stop mode as the plurality of allowable modes, the selection mode is reset to the stop mode, which has the lower intensity. As described above, the one allowable mode having the lowest intensity is selected from the plurality of allowable modes; thus, the energy-saving effect is maximized.

Next, described below is an example of a method that the inside-vehicle environment predicting unit 51 calculates the temperature $T_{indoor}$ ($t_A$), which is the predicted temperature inside the vehicle after the predicted travel time $t_A$. Assuming that the current time point is t=0, the temperatures inside the vehicle and outside the vehicle at a time t [sec.] are expressed as $T_{indoor}$ (t) and $T_{outdoor}$ (t), respectively.

In a first model, $T_{indoor}$ (t+1), which is a temperature after a unit time, is further calculated by the following equation based on $T_{indoor}$ (t) and $T_{outdoor}$ (t):

$$T_{indoor}(t+1)=T_{indoor}(t)+\{T_{outdoor}(t)-T_{indoor}(t)\}\times\alpha \quad \text{(Math 1)}$$

A coefficient α is a constant number expressing an influence of a temperature difference between the temperature inside the vehicle and the temperature outside the vehicle on the temperature inside the vehicle per unit time. The coefficient α can be calculated based on heat conductivity of the vehicle and a spatial capacity inside the vehicle, for example.

In a second model, $T_{indoor}$ (t+1) is calculated by the following equation, further considering an influence of air ventilation with respect to the first model:

$$T_{indoor}(t+1)=T_{indoor}+\{T_{outdoor}(t)-T_{indoor}(t)\}\times\alpha+\{T_{outdoor}(t)-T_{indoor}(t)\}\times\beta(t) \quad \text{(Math 2)}$$

β(t) is a function depending on an amount of air ventilation at the time t. The function β(t) is a function of modeling an influence of air ventilation when the air ventilation is performed in a predetermined pattern. If the air ventilation is not performed at t=0, β(t)=0 is satisfied. When the air ventilation is performed at a predetermined interval, β(t) can be a periodic function corresponding to the condition.

In a third model, $T_{indoor}$ (t+1) is calculated by the following equation, further considering an influence P(M), which is an influence of the air conditioning in an operation mode M on the temperature inside the vehicle, with respect to the first model:

$$T_{indoor}(t+1)=T_{indoor}(t)+\{T_{outdoor}(t)-T_{indoor}(t)\}\times\alpha+P(M) \quad \text{(Math 3)}$$

In a fourth model, $T_{indoor}$ (t+1) is calculated by the following equation, further considering the influence P(M) described above with respect to the second model:

$$T_{indoor}(t+1) = T_{indoor}(t) + \{T_{outdoor}(t) - T_{indoor}(t)\} \times \alpha + \{T_{outdoor}(t) - T_{indoor}(t)\} \times \beta(t) + P(M) \quad \text{(Math 4)}$$

When the predicted travel time $t_A$ is acquired from the predicted travel information acquisition unit 53, the temperature $T_{indoor}$ ($t_A$) inside the vehicle at the time t=$t_A$ can be calculated from the current temperature data (the time t=0) by using "Math 4" described above repeatedly, for example. The current temperature data, that is to say, the temperature $T_{indoor}$ (0) and $T_{outdoor}$ (0) can be acquired from the environmental sensor device 4. A future temperature $T_{outdoor}$ (t) (t>0) outside the vehicle can be acquired as an approximate value thereof in accordance with data of a weather forecast, or past history data of an outside air temperature. The data of the weather forecast can be acquired from an external server device. The history data can be accumulated in a storage device (a memory device such as a hard disk or a flash memory).

For example, with reference to FIG. 5, it is assumed that a calculation result of the predicted temperature $T_{indoor}$ ($t_A$) in a case where the air-conditioning is performed in the low mode is equal to the lower limit value $T_L$ in the allowable range. In this case, the consumption energy can be maximally suppressed by using the low mode while keeping the temperature inside the vehicle minimally within the allowable range.

The coefficient $\alpha$ described above may be obtained by dividing, by a heat capacity C [W/° C.] of the air of the vehicle interior, a value which is obtained by multiplying a heat conduction coefficient $\mu$ [W/° C.·m²] expressing an amount of heat conduction per unit temperature difference per unit area by a total area A [m²] of a surface contributing to heat conduction inside and outside the vehicle. The heat conduction coefficient $\mu$ may be significantly different depending on a material of a front glass and an ABS resin, for example. Assuming that the area of parts in which materials having the heat conduction coefficients $\mu_1$ to $\mu_n$, respectively, are used are $A_1$ to $A_n$, heat energy $\Delta E$ flowing into the vehicle interior or flowing out from the vehicle interior with respect to per unit temperature inside and outside the vehicle can be estimated by $\mu_1 \times A_1 + \ldots + \mu_n \times A_n$. Alternatively, $\mu_a \times A$ may be used by experimentally obtaining an average heat conduction coefficient $\mu_a$ [W/° C.·m₂], which takes an average value with respect to per area inside the vehicle. When the temperature difference between inside and outside the vehicle is $\Delta T$, $\Delta E \times \Delta T$ is a heat energy amount Q(t) [W] exchanged between inside and outside the vehicle at the time t. When the heat capacity of the air of the vehicle interior is C [W/° C.], the temperature variation inside the vehicle can be calculated by dividing the heat energy amount Q(t) by specific heat C. The coefficient $\alpha$ can also be experimentally obtained for each vehicle. When the coefficient $\alpha$ does not have high accuracy, or there is large disturbance due to a large amount of heat energy flowing into the vehicle interior caused by insolation, the accuracy of the predicted result of the vehicle interior temperature may be reduced. In such a case, the value of the coefficient $\alpha$ may be corrected by using a difference between the predicted temperature $T_{indoor}$ and a temperature which has been actually measured after an elapse of the time t.

(Effect)

According to the present embodiment, the mode controller 52 resets the selection mode to one of the at least one candidate mode in which the predicted environmental characteristic being within the allowable range is calculated by the inside-vehicle environment predicting unit 51. Accordingly, the air conditioning is performed in the operation mode which has the lower intensity, while keeping the environmental characteristic inside the vehicle 900 at the time of reaching the destination within the allowable range. Thus, suppressed is waste that air conditioning being excessive compared to the allowable range has already been performed by the time of reaching the destination. The above configuration is capable of reducing energy consumed during the traveling while preventing a significant uncomfortable feeling of a user.

When, among the plurality of candidate modes, there are the plurality of allowable modes in which the predicted environmental characteristic being within the allowable range is calculated by the inside-vehicle environment predicting unit 51, the mode controller 52 resets the selection mode to the allowable mode which has the lowest intensity among the plurality of allowable modes. The above configuration further suppresses waste that air conditioning being excessive compared to the allowable range has already been performed by the time of reaching the destination. Thus, the energy consumed during the traveling can be further reduced.

When the air-conditioning device 3 has the heat storage 33, air heating or air cooling can be performed for a while by using the heat storage 33 which has been heated or cooled even when the drive of the heat controller 32 is stopped. Accordingly, a heating condition or a cooling condition of the heat storage 33 is used more effectively before reaching the destination. Thus, the energy consumed during the traveling can be further reduced. Particularly, when the period of time from when the drive of the heat controller 32 is stopped until when the vehicle reaches the destination is sufficiently short, a negative influence of the drive stop of the heat controller 32 on the air-conditioning effect is not large.

As described above, the effect of using the heat storage 33 is particularly large in the case where the vehicle 900 is the electrical car. If the air heating according to the conventional technique is performed, the heat storage material (for example, water) is maintained at high temperature of approximately 100° C. even at the time of reaching the destination. The temperature of the heat storage material decreases while the vehicle is stopped after reaching the destination. Particularly, during winter season, the temperature of the heat storage material may rapidly decrease to nearly 0° C. until the vehicle starts traveling again. It is deemed in this case that waste corresponding to energy required to heat the heat storage material from 0° C. to 100° C. occurs. In contrast, according to the present embodiment, the heat of the heat storage 33 is effectively used before reaching the destination, thus the temperature at the time of reaching the destination may be approximately 20° C., for example. That is to say, the heat energy corresponding to a 80° C. temperature difference of water is used in the air-conditioning device 3 during traveling, compared with the conventional technique. Accordingly, waste of energy is suppressed.

When the vehicle is the electrical car, consumed electrical power energy is reduced by the present embodiment. Accordingly, a remaining amount of battery at the time of reaching the destination is increased. Thus, the time for charging at the destination is reduced. When the vehicle is a gasoline car, in a case of the air cooling, an amount of gasoline consumption caused by driving an alternator or a compressor until the vehicle reaches the destination is reduced. In a case of the air heating, a consumed power of a fan which sends engine heat into the vehicle may be reduced.

When the vehicle is a hybrid car, the effect in the case of the electrical car or the effect in the case of the gasoline car described above is obtained. Further, the energy consumed during traveling is reduced; thus the remaining amount of battery at the time of reaching the destination can be increased. Accordingly, a distance which the vehicle can travel in an electrical vehicle mode (EV mode) in a whole travel route is increased at a time of next traveling. Therefore, the vehicle can travel a longer distance in a low-speed traveling section, which decreases a gas mileage of the engine, in the EV mode. Thus, fuel economy in the next traveling is enhanced.

Embodiment 2

Figure 7:
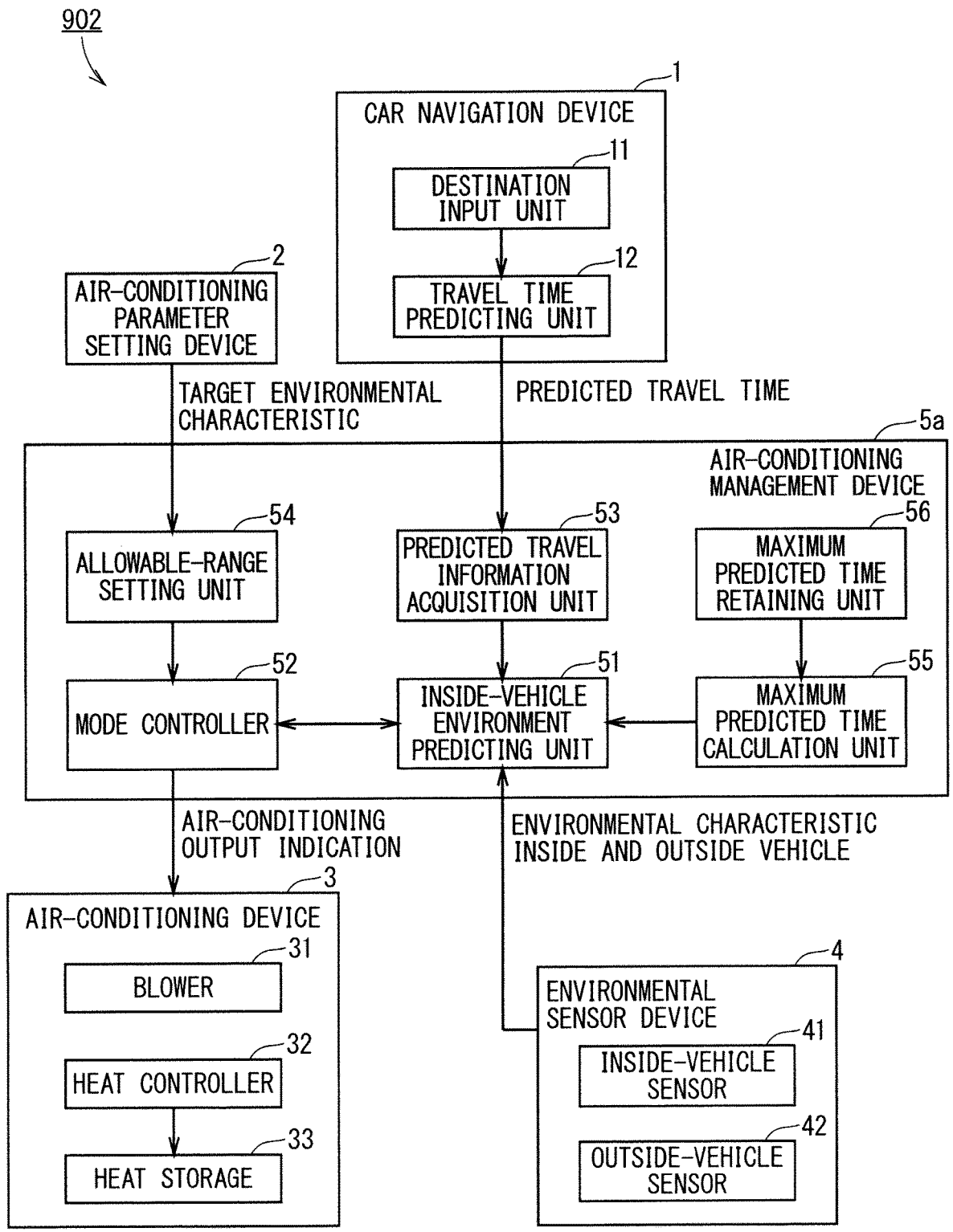
FIG. 7 A functional block diagram schematically illustrating a configuration of a vehicle air-conditioning system according to an embodiment 2 of the present invention.

With reference to FIG. 7, a vehicle air-conditioning system 902 of the present embodiment has an air-conditioning management device 5a. The air-conditioning management device 5a has a maximum predicted time retaining unit 55 and a maximum predicted time calculation unit 56 in addition to the configuration of the air-conditioning management device 5 (FIG. 1).

The maximum predicted time retaining unit 55 retains maximum predicted time information which indicates a maximum predicted time $t_{max}$. In the present embodiment, the inside-vehicle environment predicting unit 51 operates only when the predicted travel time is equal to or smaller than the maximum predicted time $t_{max}$. While the inside-vehicle environment predicting unit 51 does not operate, the air-conditioning device 3 operates directly in accordance with the targeted environmental characteristic being set by the air-conditioning parameter setting device 2. The air-conditioning device 3 typically performs pulse width modulation (PWM) control in which the temperature inside the vehicle 900 is set as the target temperature. The blower 31 or the heat controller 32 or both of them may be controlled.

The maximum predicted time calculation unit 56 calculates maximum predicted time information $t_{max}$ retained by the maximum predicted time retaining unit 55. With the calculation result, the maximum predicted time information $t_{max}$ can be adjusted to a new value in accordance. When the maximum predicted time $t_{max}$ is a fixed time, the maximum predicted time calculation unit 56 can be omitted.

Figure 3:
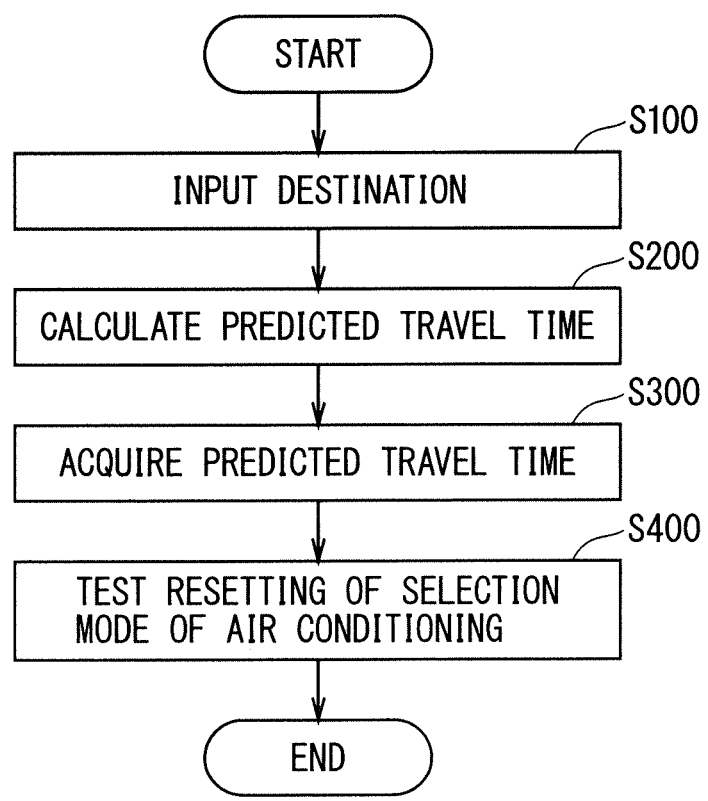
FIG. 3 A flow chart schematically illustrating a configuration of a method of controlling an air-conditioning device according to the vehicle air-conditioning system in the embodiment 1 of the present invention.
Figure 8:
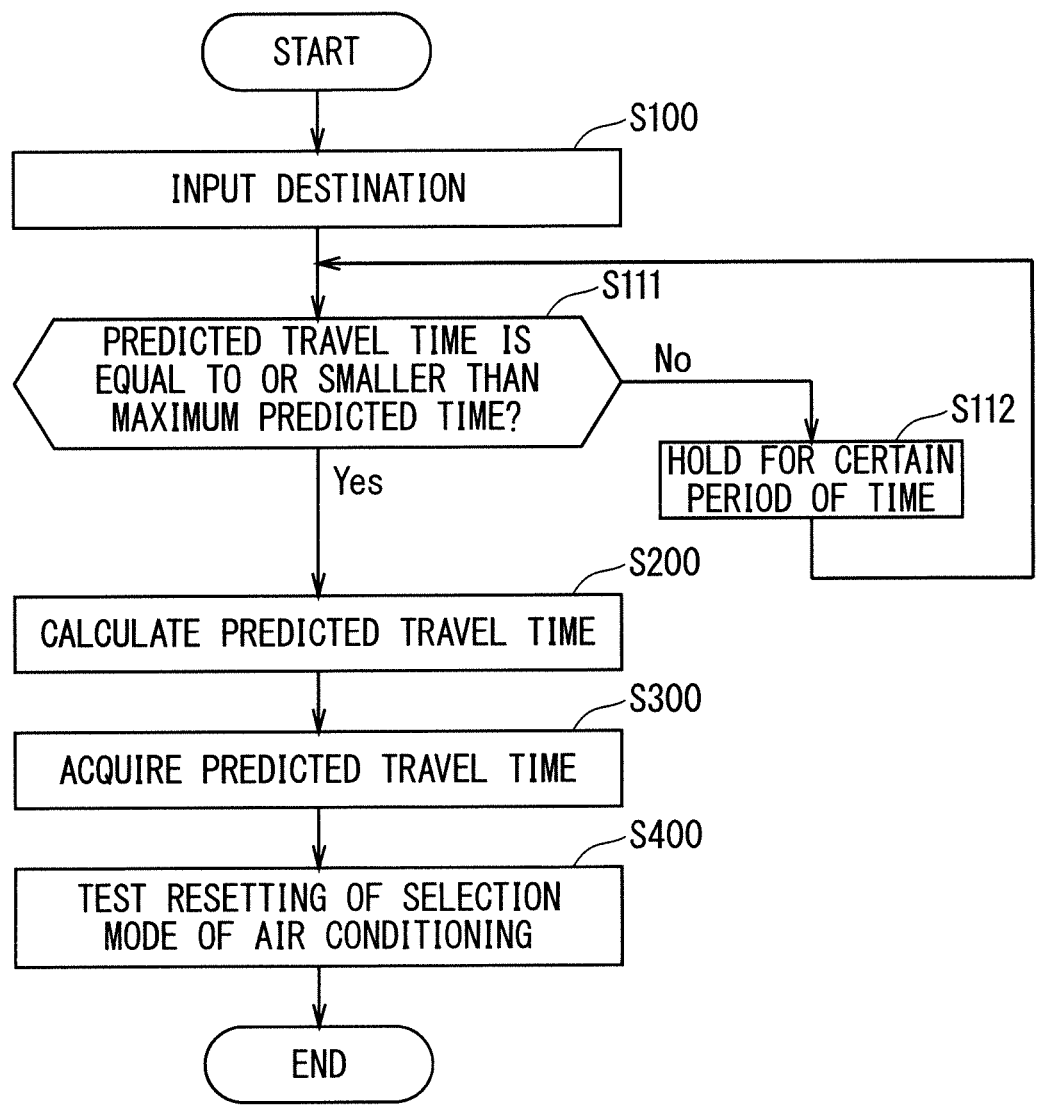
FIG. 8 A flow chart schematically illustrating a configuration of a method of controlling an air-conditioning device according to the vehicle air-conditioning system in the embodiment 2 of the present invention.

With reference to FIG. 8, in the present embodiment, Steps S111 and S112 are provided between Steps S100 and S200 described in the embodiment 1 (FIG. 3). In Step S111, it is determined whether or not the predicted travel time from the current point of time is equal to or smaller than the maximum predicted time $t_{max}$. When the determination result is true (YES), the processing proceeds to Step S200. When the determination result is false (NO), the processing is put on hold for a certain period of time in Step S112. Subsequently, Step S111 is performed again.

Next, a method of determining the maximum predicted time $t_{max}$ is described in detail hereinafter.

The maximum predicted time $t_{max}$ is preferably set so that variation of the temperature $T_{outdoor}$ (t) outside the vehicle until the vehicle reaches the destination is made equal to or smaller than approximately several ° C. Accordingly, the future temperature $T_{outdoor}$ (t) (t>0) outside the vehicle described in the embodiment 1 can be approximated by the current temperature $T_{outdoor}$ (0) outside the vehicle. When prediction accuracy of the temperature has a priority, the maximum predicted time $t_{max}$ may be set so that the variation of the temperature $T_{outdoor}$ (t) outside the vehicle is made equal to or smaller than approximately 1° C. or 0.5° C.

The maximum predicted time $t_{max}$ in which the variation of the temperature $T_{outdoor}$ (t) is sufficiently small can be determined by past weather data, for example. The maximum predicted time $t_{max}$ is preferably adjusted depending on the time in one day. For example, during a morning period (for example, from six a.m. to nine a.m.), an external temperature tends to increase rapidly due to the sun rising, thus the maximum predicted time $t_{max}$ is reduced to approximately 15 minutes. The same applies to a sunset period when the external temperature tends to decrease rapidly due to the sun setting. In contrast, during a daytime period (for example, from one p.m. to three p.m.), when the external temperature tends to be comparatively stable, the maximum predicted time $t_{max}$ is increased to approximately one hour. A specific maximum predicted time $t_{max}$ can be determined by statistically reviewing a time taken for a change of the external temperature by an allowable variation at regular intervals in one day. Alternatively, the variation of the external temperature in accordance with an elapse of an arbitrary unit time (for example, approximately five minutes to thirty minutes) may be statistically reviewed at regular intervals in one day. For example, in a case where there is data that the external temperature changes by 0.2° C. every thirty minutes in period of time of three p.m. to four p.m., when the allowable temperature change is 0.1° C., a time of fifteen minutes can be calculated as the maximum predicted time $t_{max}$ by a calculation of thirty minutes/(0.2° C./0.1° C.) on an assumption that the external temperature changes linearly. As described above, when the maximum predicted time $t_{max}$ is adjusted by the time in one day, the maximum predicted time calculation unit 56 calculates the maximum predicted time $t_{max}$ based on the time in one day.

Data of a measurement result accumulated by the outside-vehicle sensor 42 of the environmental sensor device 4 may be used as the past weather data described above. In this case, the weather data to be used corresponds to a location where the user has actually traveled. Thus, the maximum predicted time $t_{max}$ can be set more appropriately.

When the temperature outside the vehicle is accumulated every certain period of time, data volume tends to be large. For example, when temperature information is accumulated every five minutes, 288 pieces of data need to be stored per day. In this case, it is preferable to use a storage device (a memory device such as a hard disk or a flash memory) having a proper capacity.

It is also applicable, as another method of accumulating data, to accumulate an elapsed time taken for the change of the temperature outside the vehicle by an allowable amount, setting a certain point of time as a starting point. The point of time when the temperature outside the vehicle has changed by the allowable amount is set to a starting point for a measurement of a next elapsed time. When one elapsed time is approximately twenty minutes, the data is accumulated approximately three times per hour, thus the data amount can be reduced to approximately 72 per day. The above configuration enables a prevention of using a high-capacity storage device, thus a small-capacity memory can be used instead. For example, a flash ROM built into a micro controller can be used.

When the maximum predicted time calculation unit 56 is omitted, the maximum predicted time $t_{max}$ may be fixed to a certain period of time (for example, five minutes to fifteen minutes), for example.

Since the configuration other than the configuration described above is substantially the same as that of the embodiment 1 described above (FIG. 1), the same reference numerals as those described in the drawings hereinafter will be assigned to the same or corresponding element, and a repetitive description is not repeated.

According to the present embodiment, the inside-vehicle environment predicting unit 51 operates only when the predicted travel time is equal to or smaller than the maximum predicted time $t_{max}$. Accordingly, the time regarding which the temperature inside the vehicle is predicted can be limited within a range in a future not far from the current point of time. Thus, the accuracy of the temperature prediction can be increased. Thus, an uncomfortable feeling of the user is prevented more reliably. If the maximum predicted time $t_{max}$ is not set, in a case where the predicted travel time is comparatively long (for example, several tens of minutes to several hours or longer), an error in predicting the temperature inside the vehicle at the time of reaching the destination is increased. In this case, the temperature may be too high or too low at the time of reaching the destination.

In accordance with the limitation on the operation of the inside-vehicle environmental predicting unit 51 described above, the period of time from when the drive of the heat controller 32 is stopped due to the air-conditioning control using the inside-vehicle environmental predicting unit 51 until when the vehicle reaches the destination can be limited to be sufficiently short. Even if the drive of the heat controller 32 is stopped, the air-conditioning performance can be sufficiently maintained by the heat storage 33 for a short time. Thus, the negative influence of the control using the inside-vehicle environmental predicting unit 51 on the air-conditioning effect can be reduced.

Since the time regarding which the temperature inside the vehicle is predicted is limited within the range in the future not far from the current point of time, the future temperature $T_{outdoor}(t)$ (t>0) outside the vehicle described in the embodiment 1 can be approximated by the current temperature $T_{outdoor}(0)$ outside the vehicle. In this case, the acquisition of the future temperature $T_{outdoor}(t)$ outside the vehicle is unnecessary. Accordingly, it is unnecessary to receive a service of weather forecast or secure the past history data of the outside air temperature.

When the maximum predicted time calculation unit 56 is provided, the maximum predicted time $t_{max}$ can be situationally adjusted particularly in accordance with the time in one day. Accordingly, the resetting operation of the operation mode described in the embodiment 1 can be performed for a long time when the temperature can be predicted with a high degree of accuracy for the farther future, and otherwise, the resetting operation can be performed for a short time. Thus, a balance between the prevention of the uncomfortable feeling of the user and the reduction in the energy consumption can be adjusted.

Embodiment 3

With reference to FIG. 9, a vehicle air-conditioning system 903 of the present embodiment has a car navigation device 1*a*. The car navigation device 1*a* has an accumulation unit 13, a destination-predicting unit 14, and a travel-history-information generating-registering unit 15 in addition to the configuration of the car navigation device 1 (FIG. 1). The destination-predicting unit 14 predicts the destination of the vehicle 900 by using the destination-predicting information.

The accumulation unit 13 accumulates the destination-predicting information used for predicting the destination of the vehicle 900.

The travel-history-information generating-registering unit 15 generates travel history information of the vehicle 900 as the destination-predicting information, and registers the travel history information in the accumulation unit 13. The destination-predicting information may be registered at any timing after an elapse of a certain period of time, after traveling a certain distance, or at the time of the occurrence of a certain event.

The travel history information is information of a departure time point, destination arrival time point, and a travel route, for example. Specifically, the travel history information registered in traveling once (traveling from departure to arrival) preferably includes any of contents (1) to (4) described below, and more preferably includes a group of the contents (1) to (3), and still more preferably includes a group of the contents (1) to (4). One group of the contents is expressed in a form recognizable as belonging to the traveling once. Point of interest (POI) means positional information readable on the car navigation device 1, and is expressed, for example, by a unique number or a character string indicating shop information such as a convenience store.

Content (1): a departure date and time and a departure position (latitude and longitude, an address, or POI)

Content (2): an arrival date and time and an arrival position (latitude and longitude, an address, or POI)

Content (3): a travel route from a departure position to an arrival position (dot sequence information of latitude and longitude or information that can be recognized by the car navigation device 1, corresponding to the dot sequence information).

Content (4): Presence or absence of the destination setting ("present" when the travel history information is generated in the traveling after the destination is input in the destination setting unit 11, and otherwise "absent")

In addition to the travel history information described above, the destination-predicting information may include acquired information of a destination which has been input in the destination input unit 11 in past. Information registered by the user may be used as the destination-predicting information.

The accumulation unit 13 may be externally mounted on the car navigation device 1. For example, a hard disk or a solid state disk (SSD) is connected to the car navigation device 1 via an USB or a LAN wirelessly or by wire. Alternatively, the accumulation unit 13 may be attached to an attachment unit for an accumulation unit which is provided in the car navigation device 1 in advance. For example, an external data recording medium such as a secure digital (SD) card is inserted into the attachment unit such as an SD card slot of the car navigation device 1. Alternatively, the accumulation unit 13 may be built into the car navigation device 1. For example, a recording medium such as a flash memory or a hard disk is built into the car navigation device 1.

With reference to FIG. 10, an operation of the vehicle air-conditioning system 903 is described hereinafter.

In Step S121, when the vehicle starts traveling, the destination-predicting unit 14 determines whether the destination input unit 11 has input the destination to the travel time predicting unit 12. When the determination result is true (YES), the processing subsequent to Step S200 is performed in the manner similar to the embodiment 1 (FIG. 3). When the determination result is false (NO), the destination-predicting unit 14 predicts the destination, and inputs a result thereof to the travel time predicting unit 12. The destination is predicted with reference to the destination-predicting information accumulated in the accumulation unit 13. For example, a probability that the vehicle moves to a specific destination when the vehicle starts on a specific day of week in a specific period of time is calculated by using the destination-predicting information, and the destination is predicted by using a result thereof. Subsequently, the processing subsequent to Step S200 is performed in the manner similar to the embodiment 1 (FIG. 3).

The configuration other than that described above is substantially the same as the configuration of the embodiment 1 or 2 (FIG. 1 or FIG. 7) described above. Thus, the air-conditioning management device 5a (FIG. 7) may be used instead of the air-conditioning management device 5.

According to the present embodiment, even when the user does not input the destination to the destination input unit 11, the destination-predicting unit 14 inputs the destination instead. Accordingly, even when the user does not input the destination to the destination input unit 11, the effect substantially similar to that of the embodiment 1 can be obtained. For example, when the vehicle travels along a route which is familiar to the user such as a commuting route, the user does not mostly take time to input the destination. Even in such a case, when the vehicle gets close to a place of employment or a user's home, the consumed energy can be reduced for several minutes or in several kilometers before the vehicle reaches the place of employment or the user's home, for example, while the significant uncomfortable feeling of the user is prevented.

The destination-predicting information accumulated in the accumulation unit 13 preferably includes the travel history information of the vehicle. Accordingly, the prediction accuracy of the destination can be further increased.

When the destination-predicting unit 14 predicts the destination, a limitation may be put on a candidate destination thereof so that the predicted travel time to the candidate destination is within a range of a certain period of time or the travel distance to the candidate destination is within a range of a certain distance. Accordingly, the time regarding which the temperature inside the vehicle is predicted can be limited within a range in a future not far from the current point of time. Thus, the accuracy of the temperature prediction can be increased. Thus, the uncomfortable feeling of the user is prevented more reliably. Even if the drive of the heat controller 32 is stopped due to the air-conditioning control using the inside-vehicle environmental predicting unit 51, the air-conditioning performance can be sufficiently maintained by the heat storage 33 for a short time. Thus, the negative influence of the control using the inside-vehicle environmental predicting unit 51 on the air-conditioning effect can be reduced.

Embodiment 4

In the embodiments 1 to 3, the inside-vehicle environmental predicting unit 51 operates, being triggered by the input of the predicted travel time information. However, there may be a case where the user does not desire the air-conditioning control in accordance with the operation of the inside-vehicle environmental predicting unit 51 but desires a conventional air-conditioning control such as a PWM control or a manual control, for example. Thus, in the present embodiment, the operation of the inside-vehicle environmental predicting unit 51 can be switched on/off.

Figure 11:
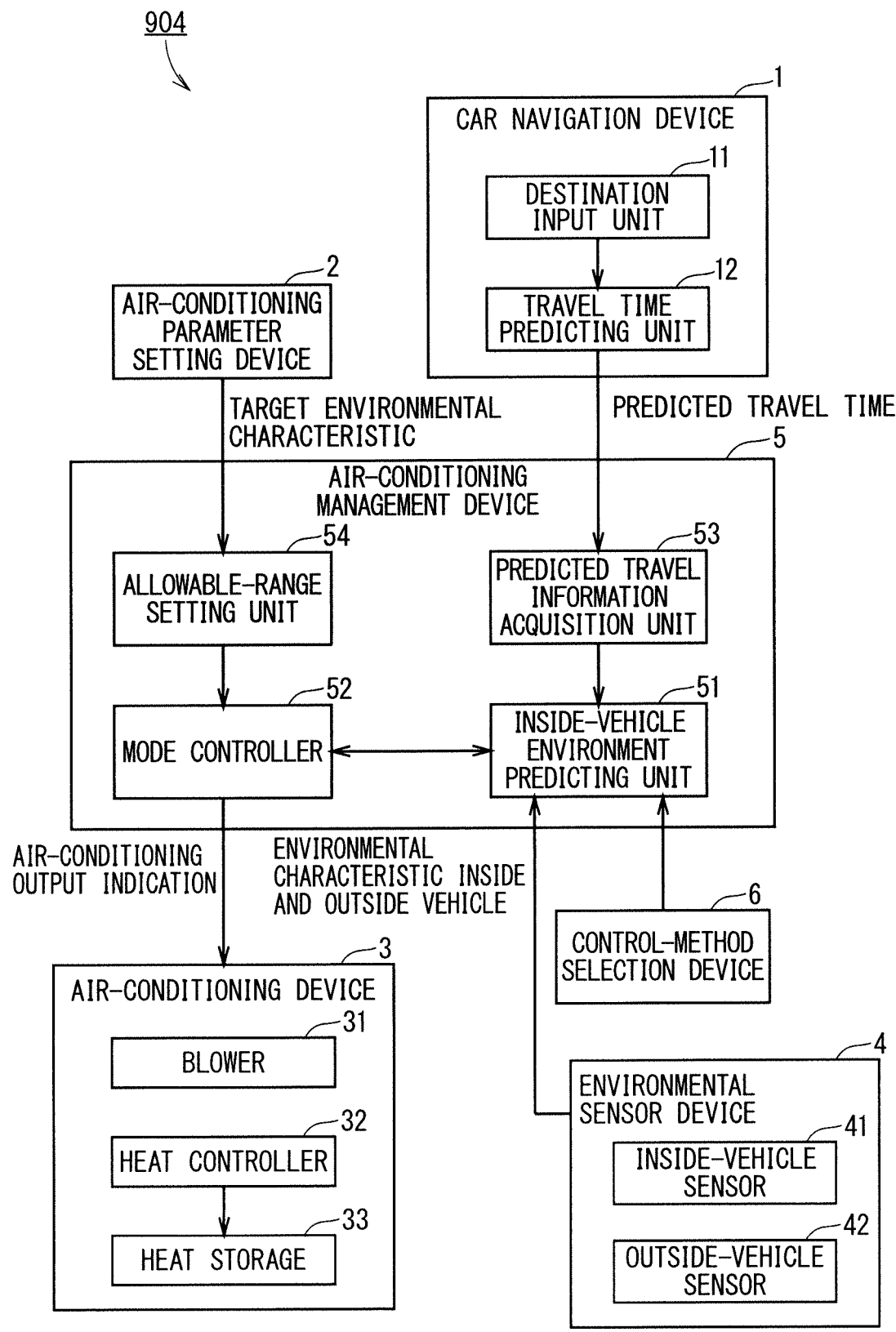
FIG. 11 A functional block diagram schematically illustrating a configuration of a vehicle air-conditioning system according to an embodiment 4 of the present invention.

With reference to FIG. 11, a vehicle air-conditioning system 904 of the present embodiment further includes a control-method selection device 6 in addition to the configuration of the embodiment 1 (FIG. 1). The control-method selection device 6 receives, from outside, the setting whether or not to allow the inside-vehicle environmental predicting unit 51 to operate. The control-method selection device 6 is, for example, an input device such as a switch, a dial, and a touch panel or a user interface applied to a screen on the car navigation device 1.

The control-method selection device 6 may operate in conjunction with the air-conditioning parameter setting device 2. In this case, options in the setting of the air-conditioning parameter setting device 2 preferably has a category of "automatic" to perform an automatic control on the air-conditioning device 3 and a category of "manual" to manually set the air-conditioning device 3. The category of "automatic" includes an option of "cooperation or non-cooperation of the destination". The control-method selection device 6 switches on and off the operation of the inside-vehicle environmental predicting unit 51 in the cases of "cooperation" and "non-cooperation", respectively.

Figure 12:
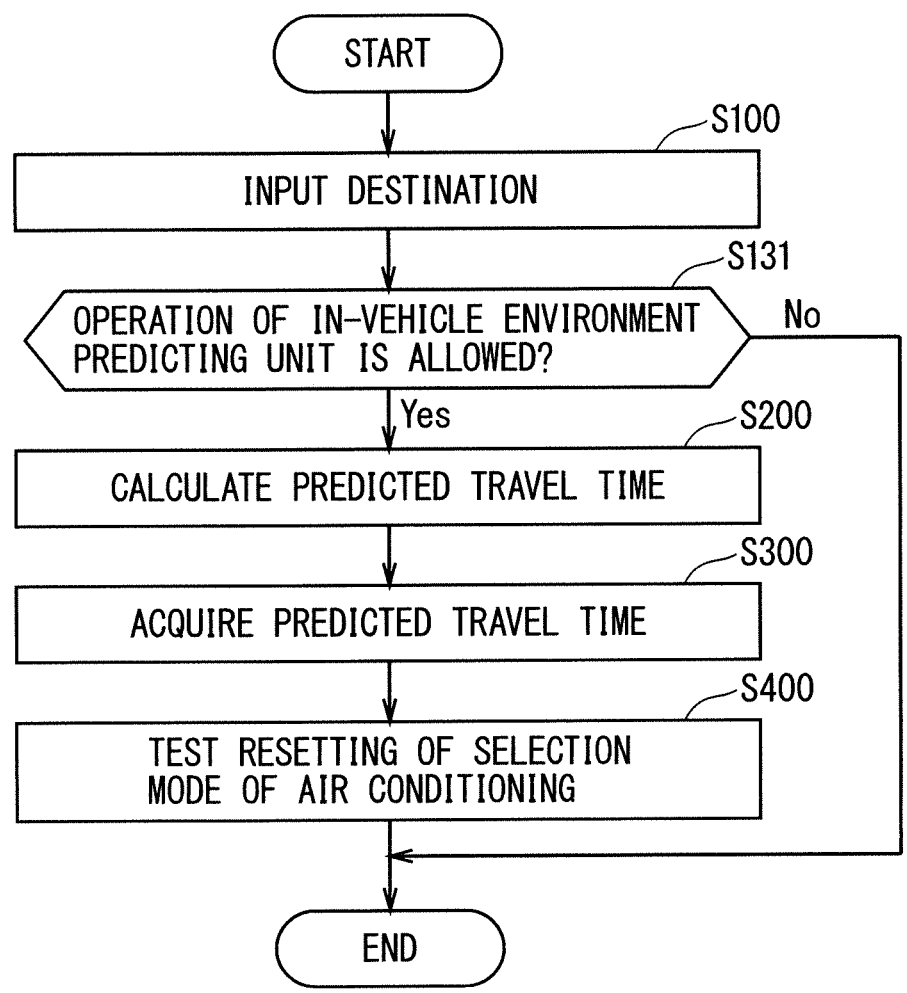
FIG. 12 A flow chart schematically illustrating a configuration of a method of controlling an air-conditioning device according to the vehicle air-conditioning system in the embodiment 4 of the present invention.

With reference to FIG. 12, an operation of the vehicle air-conditioning system 904 is described hereinafter.

After Step S100 (FIG. 3) similar to the embodiment 1, the inside-vehicle environmental predicting unit 51 determines whether the operation of the inside-vehicle environment predicting unit 51 is allowed in Step S131. When the determination result is true (YES), the processing subsequent to Step S200 (FIG. 3) is performed in the manner similar to the embodiment 1. When the determination result is false (NO), the processing is finished.

The configuration other than that described above is substantially the same as the configuration of the embodiments 1 to 3 (FIG. 1, FIG. 7, or FIG. 9) described above. Thus, the air-conditioning management device 5a (FIG. 7) may be used instead of the air-conditioning management device 5. The car navigation device 1a (FIG. 9) may be used instead of the car navigation device 1.

According to the present embodiment, the air-conditioning control in accordance with the operation of the inside-vehicle environment predicting unit 51 can be temporarily inhibited with user's intention. Accordingly, usability of the system is enhanced. For example, when a defect occurs in the air-conditioning control in accordance with the operation of the inside-vehicle environment predicting unit 51 (when an error significantly occurs in the temperature prediction inside the vehicle, for example), the control can be temporarily inhibited until the defect is solved. For example, when a problem occurs after shipping of a manufactured vehicle with the vehicle air-conditioning system 904, the air-conditioning control in accordance with the operation of the inside-vehicle environment predicting unit 51 can be inhibited, and the conventional air-conditioning control can be performed instead. If such a processing cannot be performed, inconvenience to the user increases, so that necessity of accelerating the response to the problem (typically a rewriting of control software embedded in a system) is increased.

Embodiment 5

Figure 13:
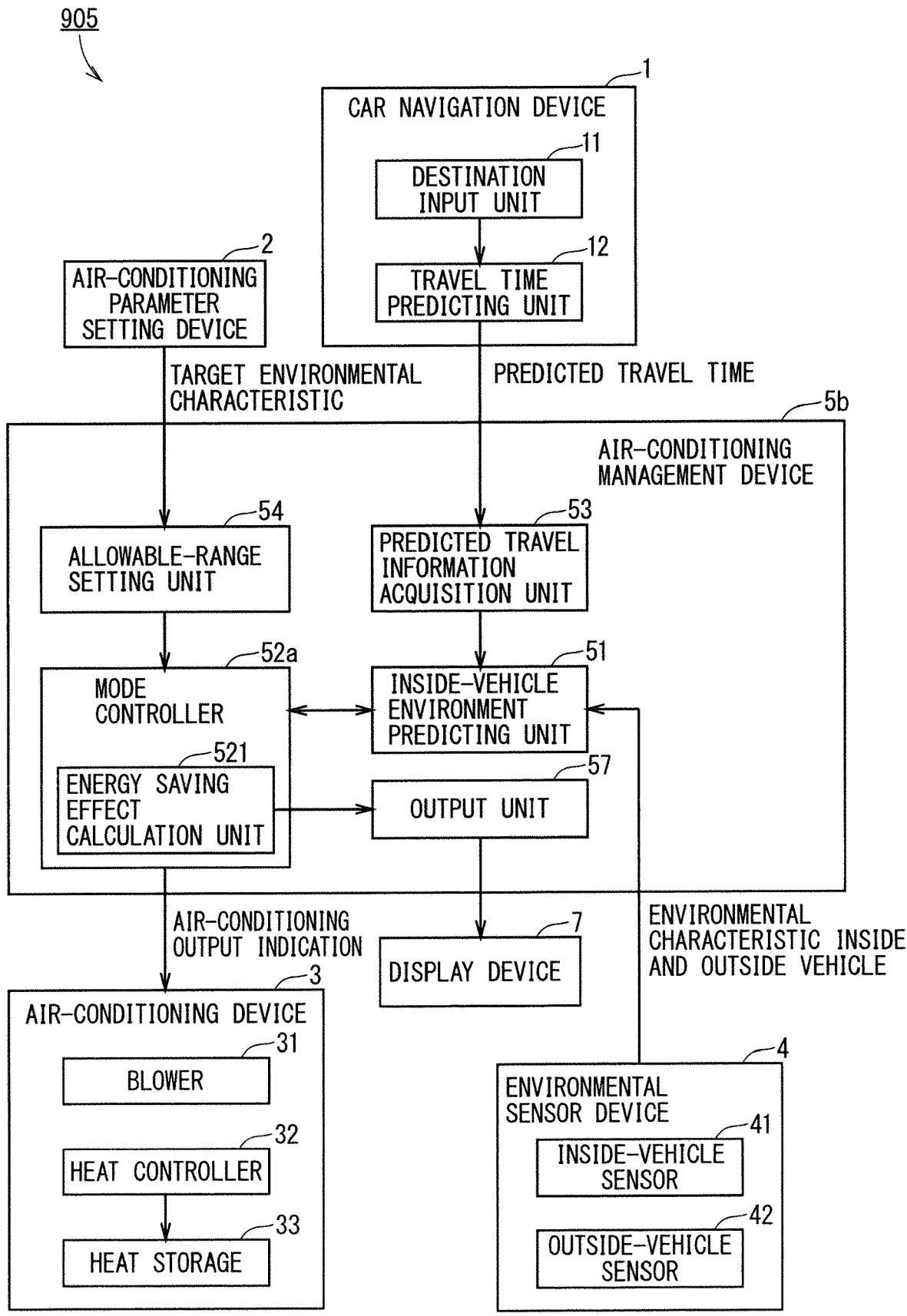
FIG. 13 A functional block diagram schematically illustrating a configuration of a vehicle air-conditioning system according to an embodiment 5 of the present invention.

With reference to FIG. 13, a vehicle air-conditioning system 905 of the present embodiment has an air-conditioning management device 5b and a display device 7. The air-conditioning management device 5b has a mode controller 52a instead of the mode controller 52 (FIG. 1) of the embodiment 1. In addition to the configuration of the mode controller 52, the mode controller 52a has an energy saving effect calculation unit 521 calculating an energy-saving effect achieved by resetting the selection mode. The air-conditioning management device 5b has an output unit 57.

Figure 14:
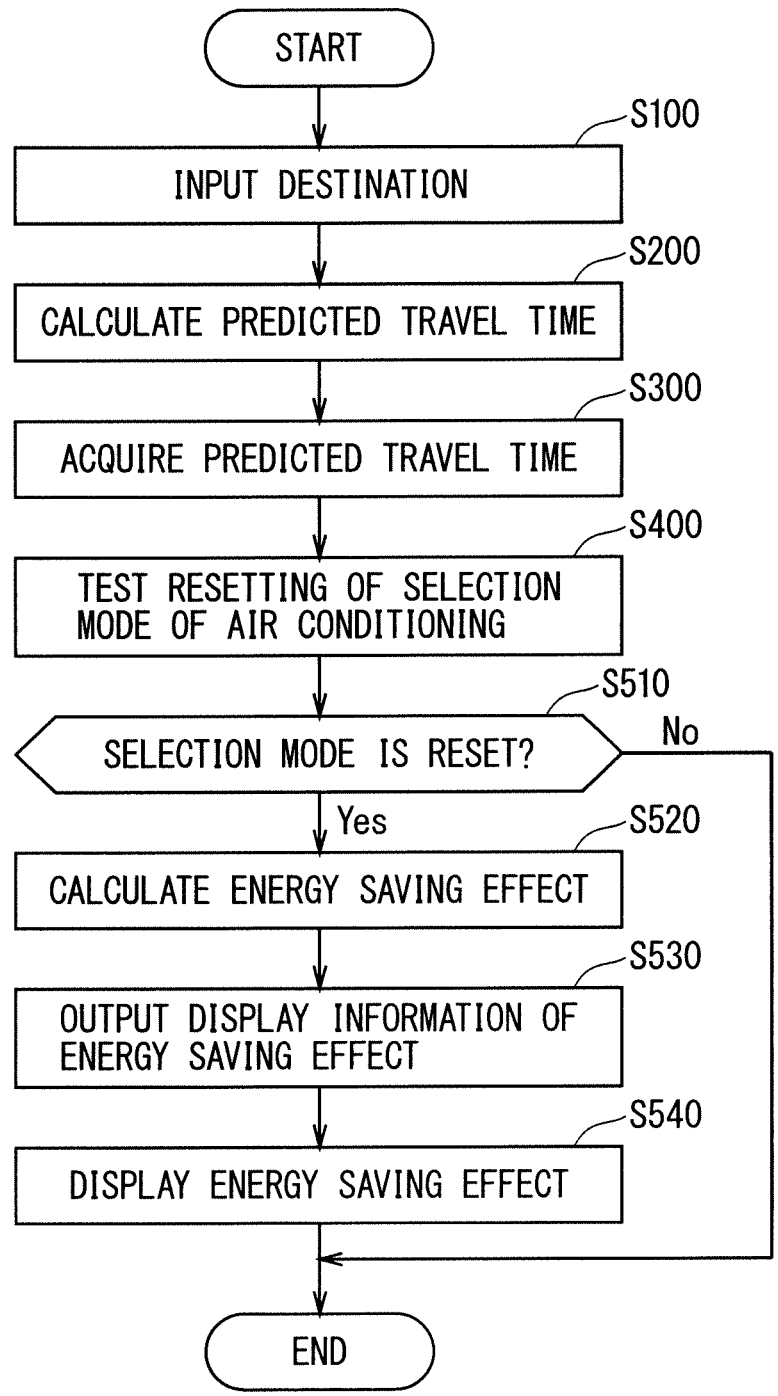
FIG. 14 A flow chart schematically illustrating a configuration of a method of controlling an air-conditioning device according to the vehicle air-conditioning system in the embodiment 5 of the present invention.

With reference to FIG. 14, an operation of the vehicle air-conditioning system 905 is described hereinafter.

After the processing similar to that of the embodiment 1 proceeds to Step S400 (FIG. 3), it is determined whether or not the selection mode of the air-conditioning device 3 has been reset in Step S510. When the determination result is false (NO), the processing is finished. When the determination result is true (YES), the energy saving effect calculation unit 521 calculates the energy saving effect in Step S520. Next, in Step S530, the output unit 57 outputs display information of the energy saving effect. Next, the display device 7 displays the energy saving effect in Step S540.

Figure 15:
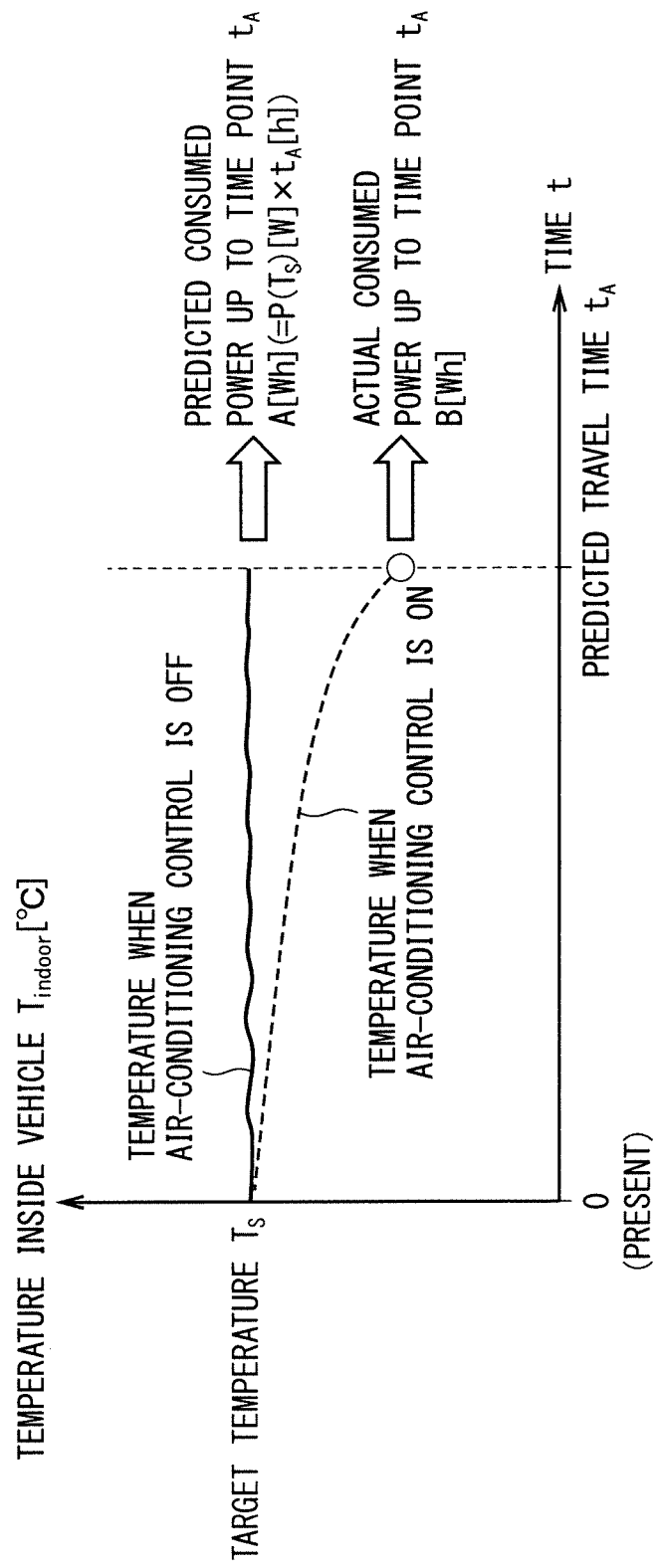
FIG. 15 A graph drawing for describing a calculation of an energy-saving effect in FIG. 14.

With reference to FIG. 15, an example of calculation and display of the energy saving effect is described hereinafter.

The energy saving effect calculation unit 521 calculates a difference between a predicted consumed power A [Wh] in a case where the mode controller 52 of the air-conditioning management device 5 maintains the target temperature $T_S$ to the destination and a predicted consumed power B [Wh] in a case where the air-conditioning control based on the operation of the inside-vehicle environment predicting unit 51 is performed.

The predicted consumed power A [Wh] is calculated from a product of a consumed power $P_S$ [W] of the air conditioning required to maintain the target temperature $T_S$ at that time and the predicted travel time to the destination. As $P_S$ [W], a value calculated in an experiment in advance may be used, or an output value [W] in a state where the air conditioning maintains the target temperature $T_S$ at the time of starting control may be used.

When the air-conditioning control based on the operation of the inside-vehicle environment predicting unit 51 is started, the temperature inside the vehicle transitions along a broken line illustrated in FIG. 15. The energy saving effect calculation unit 521 calculates a sum B [Wh] of electrical power consumed by the air-conditioning device 3 in the period of time (time t=0 to $t_A$).

The energy saving effect calculation unit 521 calculates A−B [Wh] as the energy saving effect at the time of reaching the destination. A result thereof is output by the output unit 57, and displayed by the display device 7.

The displayed content may be data of charging time or an electricity fee when an electrical car or a plug-in hybrid car is charged with the electrical power corresponding to the electrical power A−B [Wh]. The charging time can be calculated by (A−B)/$P_C$ when information of a charging power $P_C$ [W] is input to the energy saving effect calculation unit 521 in advance, for example. The electricity fee can be calculated by (A−B)/C when information of a fee C [Wh/yen] is input to the energy saving effect calculation unit 521 in advance, for example.

A cumulative value of electrical power reduced in several times of traveling to the destination may be displayed instead of displaying the electrical power reduced in traveling once. Accordingly, even when the electrical power A−B [Wh] is small in the traveling once, the user can be provided with impression of reduction effect more significantly.

In a gasoline car, A−B may be displayed as an energy amount instead of an electrical power amount. A gasoline cost may be displayed instead of the electricity fee.

The configuration other than that described above is substantially the same as the configuration of the embodiments 1 to 4 (FIG. 1, FIG. 7, FIG. 9, or FIG. 11) described above. Thus, the air-conditioning management device 5a (FIG. 7) may be used instead of the air-conditioning management device 5. The car navigation device 1a (FIG. 9) may be used instead of the car navigation device 1. The vehicle air-conditioning system 905 may have the control-method selection device 6 (FIG. 11).

According to the present embodiment, the user can be informed of the energy saving effect. Specifically, the user can visually grasp the energy saving effect. Accordingly, a promotion of usage of the present system is expected. As a result, the energy consumed in the air-conditioning device 3 is reduced. Particularly, when the vehicle is the electrical car or the plug-in hybrid car, the electrical power used for the charging is reduced. Thus, an amount of power generation caused by thermal power generation in an electrical power company, for example, can also be reduced. Thus, $CO_2$ emissions can also be reduced.

In the functional block diagrams of the vehicle air-conditioning systems 901 to 905 (FIG. 1, FIG. 7, FIG. 9, FIG. 11, and FIG. 13) in each embodiment described above, the car navigation device, the air-conditioning parameter setting device, the air-conditioning device, the air-conditioning management device, and the environmental sensor device are illustrated as individual components, however, some of or whole components may be configured as one device as actual hardware. For example, at least some of the air-conditioning parameter setting device, the air-conditioning management device, and the environmental sensor device may be provided to be integral with the air-conditioning device.

An interface between the devices in the vehicle air-conditioning system may be wired or wireless. The car navigation device needs not be mounted on the vehicle, but may be made up of a ground-based server or a mobile device brought into the vehicle, for example. The same applies to the air-conditioning management device.

The vehicle air-conditioning system needs not include the car navigation system. When the vehicle air-conditioning system has the predicted travel information acquisition unit, the predicted travel time information to be required can be acquired from the car navigation system provided outside the vehicle air-conditioning system via the predicted travel information acquisition unit. The vehicle air-conditioning system may have only a part of the car navigation system, and a configuration in which the destination input unit is included but the travel time predicting unit is not included may be used, for example.

The present invention can achieve the significantly large effect when the air-conditioning device has the heat storage. However, the air-conditioning device does not necessarily need to have the heat storage.

According to the present invention, the above embodiments can be arbitrarily combined, or each embodiment can be appropriately varied or omitted within the scope of the invention. The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1, 1a car navigation device, 2 air-conditioning parameter setting device, 3 air-conditioning device, 4 environmental sensor device, 5, 5a, 5b air-conditioning management device, 6 control-method selection device, 7 display device, 11 destination input unit, 12 travel time predicting unit, 13 accumulation unit, 14 destination-predicting unit, 15 travel-history-information generating-registering unit, 31 blower, 32 heat controller, 33 heat storage, 41 inside-vehicle sensor, 42 outside-vehicle sensor, 51 inside-vehicle environment predicting unit, 52, 52a mode controller, 53 predicted travel information acquisition unit, 54 allowable-range setting unit, 55 maximum predicted time retaining unit, 56 maximum predicted time calculation unit, 57 output unit, 521 calculation unit, 900 vehicle, 901 to 905 vehicle air-conditioning system.

The invention claimed is:

1. A vehicle air-conditioning system, comprising:
an air-conditioning device performing air conditioning inside a vehicle in a selection mode, which is one of a plurality of operation modes, when a notification of air-conditioning output indication information indicating the selection mode is transmitted to the air-conditioning device;
an environmental sensor device outputting inside-vehicle sensor information indicating a detection result of an environmental characteristic inside the vehicle and outside-vehicle sensor information indicating a detection result of an environmental characteristic outside the vehicle;
an air-conditioning parameter setting device outputting targeted environmental characteristic information indicating a target of the environmental characteristic inside the vehicle; and
an air-conditioning management device including:
an allowable-range setting unit setting, by an upper limit value and a lower limit value of a temperature inside the vehicle based on a targeted temperature, an allowable range of the environmental characteristic inside the vehicle based on the targeted environmental characteristic information being output from the air-conditioning parameter setting device;
a predicted travel information acquisition unit acquiring predicted travel time information indicating a predicted travel time until the vehicle reaches a destination;
an inside-vehicle environment predicting unit calculating, by using the inside-vehicle sensor information and the outside-vehicle sensor information being output from the environmental sensor device and the predicted travel time acquired by the predicted travel information acquisition unit, at least one predicted environmental characteristic which is an environmental characteristic inside the vehicle after the predicted travel time on an assumption that the air-conditioning device is operated in each of at least one candidate mode which has lower intensity than intensity of the selection mode among the plurality of operation modes; and
a mode controller transmitting a notification of the air-conditioning output indication information to the air-conditioning device, wherein
the mode controller resets the selection mode to one of the at least one candidate mode in which the predicted environmental characteristic being within the allowable range is calculated by the inside-vehicle environment predicting unit,
when the plurality of operation modes include a plurality of modes each having lower intensity than the intensity of the selection mode, the at least one candidate mode includes a plurality of candidate modes,
when, among the plurality of candidate modes, there are a plurality of allowable modes in which the predicted environmental characteristic being within the allowable range is calculated by the inside-vehicle environment predicting unit, the mode controller resets the selection mode to an allowable mode having lowest intensity among the plurality of allowable modes, and
the inside-vehicle environment predicting unit uses an inside-vehicle temperature predictive calculation model including a term in which a temperature inside the vehicle changes in proportion to a temperature difference inside and outside the vehicle to calculate a predicted temperature inside the vehicle after the predicted travel time as the predicted environmental characteristic.

2. The vehicle air-conditioning system according to claim 1, wherein
the inside-vehicle temperature predictive calculation model used by the inside-vehicle environment predicting unit further includes a term in which a temperature inside the vehicle changes in proportion to a product of a temperature difference inside and outside the vehicle and an amount of air ventilation.

3. The vehicle air-conditioning system according to claim 1, wherein
the air-conditioning management device further has a maximum predicted time retaining unit retaining maximum predicted time information indicating a maximum predicted time, and
the inside-vehicle environment predicting unit operates only when the predicted travel time is equal to or smaller than the maximum predicted time.

4. The vehicle air-conditioning system according to claim 1, wherein
the air-conditioning device includes a heat storage, a heat controller performing at least one of heating and cooling of the heat storage, and a blower sending, into the vehicle, air on which a heat exchange with the heat storage has been performed, and
the plurality of operation modes include an operation mode for operating the blower while stopping the heat controller.

5. The vehicle air-conditioning system according to claim 4, wherein
the vehicle is an electrical car.

6. The vehicle air-conditioning system according to claim 1, further comprising:
an accumulation unit accumulating destination-predicting information used for predicting the destination of the vehicle; and
a destination-predicting unit predicting the destination of the vehicle by using the destination-predicting information.

7. The vehicle air-conditioning system according to claim 6, wherein
the destination-predicting information includes travel history information of the vehicle.

8. The vehicle air-conditioning system according to claim 3, further comprising:
an accumulation unit accumulating destination-predicting information used for predicting the destination of the vehicle; and
a destination-predicting unit predicting the destination of the vehicle by using the destination-predicting information, wherein the destination-predicting information includes travel history information of the vehicle, and the air-conditioning management device includes a maximum predicted time calculation unit calculating the maximum predicted time information retained by the maximum predicted time retaining unit.

9. The vehicle air-conditioning system according to claim 8, wherein a maximum predicted time calculated by the maximum predicted time calculation unit is a time in which a change of a temperature outside the vehicle before reaching a destination has a value equal to or smaller than a predetermined value.

10. The vehicle air-conditioning system according to claim 1, further comprising:

a control-method selection device receiving a setting whether or not to allow the inside-vehicle environmental predicting unit to operate.

11. The vehicle air-conditioning system according to claim 1, wherein the mode controller includes an energy-saving effect calculation unit calculating an energy-saving effect achieved by resetting the selection mode.

* * * * *